United States Patent
Bernhard et al.

(10) Patent No.: US 9,212,269 B2
(45) Date of Patent: Dec. 15, 2015

(54) PMI FOAMS WITH IMPROVED MECHANICAL PROPERTIES, IN PARTICULAR WITH INCREASED ELONGATION AT TEAR

(75) Inventors: Kay Bernhard, Darmstadt (DE); Mathias Hempler, Freigericht (DE); Werner Geyer, Brensbach (DE); Thomas Barthel, Heppenheim (DE); Torsten Jahn, Dieburg (DE)

(73) Assignee: Evonik Roehm GmbH, Darmstadt (DE)

( * ) Notice: Subject to any disclaimer, the term of this patent is extended or adjusted under 35 U.S.C. 154(b) by 6 days.

(21) Appl. No.: 13/808,472

(22) PCT Filed: Jun. 29, 2011

(86) PCT No.: PCT/EP2011/060888
§ 371 (c)(1),
(2), (4) Date: Jan. 4, 2013

(87) PCT Pub. No.: WO2012/028353
PCT Pub. Date: Mar. 8, 2012

(65) Prior Publication Data
US 2013/0108817 A1    May 2, 2013

(30) Foreign Application Priority Data

Aug. 31, 2010 (DE) .......................... 10 2010 040 010
Sep. 6, 2010 (DE) .......................... 10 2010 040 286

(51) Int. Cl.
| | | |
|---|---|---|
| *C08F 220/46* | (2006.01) | |
| *C08J 9/14* | (2006.01) | |
| *B32B 5/18* | (2006.01) | |
| *C08J 9/04* | (2006.01) | |
| *C08F 220/42* | (2006.01) | |

(52) U.S. Cl.
CPC .   *C08J 9/142* (2013.01); *B32B 5/18* (2013.01); *C08F 220/42* (2013.01); *C08F 220/46* (2013.01); *C08J 9/04* (2013.01); *B32B 2250/03* (2013.01); *B32B 2266/0242* (2013.01); *C08J 2201/026* (2013.01); *C08J 2203/12* (2013.01); *C08J 2333/20* (2013.01); *Y10T 428/1376* (2013.01)

(58) Field of Classification Search
USPC ............. 521/142, 149, 150; 526/317, 318.43, 526/342; 428/36.5
See application file for complete search history.

(56) References Cited

U.S. PATENT DOCUMENTS

| | | |
|---|---|---|
| 4,774,118 A | 9/1988 | Davis et al. |
| 4,996,109 A | 2/1991 | Krieg et al. |
| 5,928,459 A | 7/1999 | Geyer et al. |
| 6,670,405 B1 | 12/2003 | Servaty et al. |
| 7,169,339 B2 | 1/2007 | Stein et al. |
| 8,722,751 B2 * | 5/2014 | Scherble et al. ............... 521/149 |
| 2007/0077442 A1 * | 4/2007 | Scherble et al. ........... 428/473.5 |
| 2010/0189954 A1 | 7/2010 | Roth |
| 2010/0308965 A1 | 12/2010 | Weitzhandler et al. |
| 2011/0015288 A1 * | 1/2011 | Ranft et al. ................... 521/119 |

FOREIGN PATENT DOCUMENTS

| | | | |
|---|---|---|---|
| CN | 101 709 574 | 5/2010 | |
| DE | 10 2007 033 120 | 1/2009 | |
| EP | 0 356 714 | 3/1990 | |
| EP | 0 874 019 | 10/1998 | |
| JP | 63-275647 A | 11/1988 | |
| JP | 2007-513213 A | 5/2007 | |
| JP | 2010-132860 A | 6/2010 | |
| JP | 2010-132860 A | 6/2010 | |
| WO | 03 020804 | 4/2003 | |
| WO | 03 078514 | 9/2003 | |
| WO | 2008 113815 | 9/2008 | |
| WO | 2009 050662 | 4/2009 | |
| WO | WO 2009/118373 A1 | 10/2009 | |
| WO | WO 2009118373 A1 * | 10/2009 | ................. C08J 9/30 |

OTHER PUBLICATIONS

International Search Report Issued Aug. 26, 2011 in PCT/EP11/60888 Filed Jun. 29, 2011.
Japanese Office Action issued Nov. 4, 2014 in Patent Application No. 2013-526376 (with English Translation).
Office Action dated May 12, 2015 in Taiwan Application No. 100130669 with English Translation.

* cited by examiner

*Primary Examiner* — Irina S Zemel
*Assistant Examiner* — Jeffrey Lenihan
(74) *Attorney, Agent, or Firm* — Oblon, McClelland, Maier & Neustadt, L.L.P.

(57) ABSTRACT

The invention relates to compounds for producing polymethacrylimide foam materials (PMI foams) with particularly good mechanical properties, in particular with a particularly advantageous elongation at tear. The invention further relates to methods for producing, processing, and using said foam materials. In particular, the invention relates to novel materials, the propensity of which to form tears is clearly reduced in comparison to the prior art. This is tantamount to an elongation at tear that is higher in comparison to the prior art.

16 Claims, No Drawings

PMI FOAMS WITH IMPROVED MECHANICAL PROPERTIES, IN PARTICULAR WITH INCREASED ELONGATION AT TEAR

FIELD OF THE INVENTION

The invention relates to compositions for producing polymethacrylimide foams (PMI foams) with particularly good mechanical properties, in particular with particularly advantageous tensile strain at break. The invention further relates to processes for production thereof, processing and use of the said foams. The invention in particular relates to novel materials which have markedly reduced tendency toward cracking when comparison is made with the prior art. This is equivalent to higher tensile strain at break when comparison is made with the prior art.

PRIOR ART

PMI foams, e.g. ROHACELL® from Evonik Röhm, are used as structural foam in composites and to this end are processed together with outer layers composed of fibres, mostly carbon fibres or glass fibres, and resins. The composites are often constructed at temperatures of 180° C., while the component is also intended for use at temperatures of −55° C. The different coefficients of thermal expansion (CTEs) of the outer layer and of the PMI foams produce cracks in the core on cooling, and this is a criterion that excludes the use of PMI foams in components of this type. The materials usually fail corresponding airline industry tests. There is therefore a high level of interest in foam materials with improved tensile strain at break, not only in processing industries such as the aerospace industry but also among producers of road vehicles or rail vehicles.

PMI foams have been known for a long time. The said foams with trademark ROHACELL® are used in particular in many applications in the sector of layer materials (laminates, composites, foam-composite products, sandwich structures, sandwich materials). Layer materials are mouldings composed of an external outer layer and of an internal core material. The outer layers used comprise materials which can tolerate extremely high tensile forces, monoaxially or multiaxially. Examples are glass textile and carbon-fibre textile, and also aluminium sheets, fixed to the core material by adhesive resins. Core materials used preferably comprise materials with low densities, typically in the range of 30 kg/m$^3$ and 200 kg/m$^3$.

Isotropic foams of this type are capable of tolerating shear forces in all spatial directions. An advantage is easy mechanical working by the tooling and machinery conventionally used for wood. Certain rigid foams, e.g. ROHACELL®, can moreover be thermoformed. A considerable advantage of closed-pore rigid foams is that penetration of resin, which would increase total weight, is prevented. DE2726260 describes the production of PMI foams which have excellent mechanical properties, even at high temperatures. The foams are produced by the casting process, i.e. monomers and necessary additives are mixed and polymerized in a cell. In a second step, the polymer is foamed by heating. However, these standard materials do not exhibit particularly high tensile strain at break.

Mechanically stable PMI foams crosslinked with allyl methacrylate are found in EP 356 714. Again, these very strong foams exhibit only very low tensile strain at break. The same applies to the PMI foams which are disclosed in JP 2006 045532, crosslinked ionically by metal salts.

One particular field of development in recent years involves fine-pore foams based on PMI. These are described by way of example in EP 532023. However, the process described in that document has various serious disadvantages. The resultant foams, free from crosslinking agent, have only low heat resistance, and poor creep performance.

Fine-pore foams with crosslinking agent are likewise known and are found in EP 1 678 244. The said fine-pore materials can have tensile strain at break of up to 5.5%. It is possible to achieve fine-pore character via variation of blowing agents or by adding insoluble nucleating agents. The use of insoluble nucleating agents can produce relatively fine-pore materials, but the said nucleating agents require the use of antisettling agents, with attendant increased production cost. However, there have been no small-pore foams described with ultimate tensile strengths greater than 5.5%.

The only known solution to the problem of inadequate tensile strain at break was provided by the product ROHACELL® FX. The plasticizing effect in the said product was due to increased water absorption resulting from an additive system. However, PMI foams with high water content also exhibit marked impairment of mechanical or thermomechanical properties.

CN 100420702 describes PMI foams based on acrylonitrile. Although these exhibit good values for ultimate tensile strength, at the same time they exhibit a slightly reduced level of thermomechanical properties.

Object

It was therefore an object of the present invention to find formulations for the production of PMI foams with particularly high ultimate tensile strength. The foams are moreover intended to have equally good or even improved thermomechanical properties, when comparison is made with the known PMI foams.

A particular object was to provide PMI foams with tensile strain at break values greater than 6.0%, very particularly greater than 9.0%.

Another object of the present invention was to provide PMI foams with reduced cracking. The said reduced cracking is to be ensured especially in the temperature range from −60° C. to 200° C.

Achievement of Objects

The objects are achieved via a novel process for producing foamable crosslinked polymers, in particular of PMI foams, where the polymer comprises (meth)acrylic acid, (meth)acrylonitrile and a (meth)acrylic diester of a diol which has a molar mass of at least 250 g/mol.

In particular, the mixture for producing the polymer in the process according to the invention is composed at least of from 30 to 70% by weight of (meth)acrylic acid, from 30 to 60% by weight of (meth)acrylonitrile, from 0.01 to 15% by weight of (meth)acrylic diester of a diol which has a molar mass of at least 250 g/mol, from 0.01 to 15% by weight of blowing agent and from 0.01 to 2.0% by weight of polymerization initiators.

The expression (meth)acrylic acid means methacrylic acid, acrylic acid or a mixture of the two. The expression (meth)acrylonitrile means methacrylonitrile, acrylonitrile or a mixture of the two. An expression such as alkyl (meth)acrylate has a corresponding meaning. It means the alkyl ester of methacrylic acid, of acrylic acid or of a mixture of the two.

The diol from which the (meth)acrylic diester is formed is a polyetherdiol, a polyesterdiol, an OH-functional oligo (meth)acrylic telechelic compound or a polyolefindiol, preferably a polyetherdiol. The (meth)acrylic diesters can be produced from the diols by way of known processes, such as transesterification with (meth)acrylic esters or esterification with (meth)acrylic acid or with (meth)acryloyl halides.

The diols have a minimum molar mass of 250 g/mol, preferably of 400 g/mol. The maximum molar mass of the diols is 5000 g/mol, preferably 2000 g/mol and particularly preferably 1500 g/mol.

The polyetherdiols can involve polyethylene oxide, polypropylene oxide, polymethylene oxide or polytetrahydrofuran.

The polyesterdiols preferably involve short-chain amorphous polyesterdiols, produced from diacids and from diols, or involve polyesterdiols, where these can be produced by way of a ring-opening polymerization reaction, an example being polylactide or polyglycolide, or involve polylactic acid.

Oligo(meth)acrylate telechelic compounds are available by way of example by way of a controlled free-radical polymerization reaction, for example atom transfer radical polymerization (ATRP).

The polyolefins that can be used according to the invention are non-crystalline, short-chain polyolefins, such as atactic polypropylene, polybutadiene, hydrogenated polybutadiene, EPDM, EPM or APAOS (amorphous poly-alpha-polyolefins).

An initially low level of crosslinking stabilizes the PMI foam during the foaming procedure, thus permitting the production of homogeneous foams. At the same time, the heat resistance and the creep performance of the foam are improved by crosslinking agents. Surprisingly, it has been found that when the crosslinking agents used are exclusively or to some extent long-chain compounds, the resultant PMI foams have particularly good tensile strain at break. The creep performance (creep) is measured according to the invention in compliance with DIN 53425, ASTM D621 and D2990 at 180° C., with a measurement time of two hours and with a suitable pressure that depends on the density of the material.

The process according to the invention provides further advantages in comparison with the processes of the prior art:
Fine-pore PMI foams are obtained, and the density of these is in the desired range of 30 to 300 kg/m$^3$.
The desired high tensile strain at break has been ensured within a wide temperature range from −60° C. to 200° C.
The polymerization reaction uses homogeneous, low-viscosity liquid mixtures which can be produced and further processed in a manner which is technically simple.
Alongside the tensile strain at break, the other mechanical properties, heat resistance and creep performance, are markedly better than for commercially available products.

Blowing agents that can be used comprise the following compounds and mixtures thereof: formamide, formic acid, urea, itaconic acid, citric acid, dicyandiamide, water, monoalkylureas, dimethylurea, 5,5'-azobis-5-ethyl-1,3-dioxane, 2,2'-azobis(N-butylisobutyramide), 2,2'-azobis(N-diethylisobutyramide), 2,2',4,4,4',4'-hexamethyl-2,2'-azopentane, 2,2'-azobis(2-methylpropane), dimethyl carbonate, di-tert-butyl carbonate, acetone cyanohydrin carbonate, methyl oxyisobutyrate carbonate, N-methylurethane, N-ethylurethane, N-tert-butylurethane, urethane, oxalic acid, maleic acid, oxyisobutyric acid, malonic acid, cyanoformamide, dimethylmaleic acid, tetraethyl methanetetracarboxylate, N-butyl oxamate, trimethyl methanetricarboxylate, triethyl methanetricarboxylate, and also monohydric alcohols composed of from 3 to 8 carbon atoms, e.g. 1-propanol, 2-propanol, 1-butanol, 2-butanol, tert-butanol and isobutanol.

The initiators used comprise compounds and initiator systems which can initiate free-radical polymerization reactions. Known classes of compound are peroxides, hydroperoxides, peroxodisulphates, percarbonates, perketals, peroxyesters, hydrogen peroxide and azo compounds. Examples of initiators are hydrogen peroxide, dibenzoyl peroxide, dicyclohexyl peroxodicarbonate, dilauroyl peroxide, methyl ethyl ketone peroxide, acetylacetone peroxide, di-tert-butyl peroxide, tert-butyl hydroperoxide, cumene hdyroperoxide, tert-butyl peroctanoate, tert-butyl 2-ethylperhexanoate, tert-butyl perneodecanoate, tert-amyl perpivalate, tert-butyl perpivalate, tert-butyl perbenzoate, lithium peroxodisulphate, sodium peroxodisulphate, potassium peroxodisulphate and ammonium peroxodisulphate, azoisobutyronitrile, 2,2-azobisiso-2, 4-dimethylvaleronitrile, 2,2-azobisisobutyronitrile, 2,2'-azobis(2-amidinopropane) dihydrochloride, 2-(carbamoylazo)isobutyronitrile and 4,4'-azobis(cyanovaleric acid). Redox initiators (H. Rauch-Puntigam, Th. Völker, Acryl—and Methacrylverbindungen [Acrylic and methacrylic compounds], Springer, Heidelberg, 1967 or Kirk-Othmer, Encyclopedia of Chemical Technology, Vol. 1, pp. 286 ff., John Wiley & Sons, New York, 1978) are equally suitable. It can be advantageous to combine initiators and initiator systems with different decomposition properties in respect of time and temperature. The amounts preferably used of the initiators are from 0.01 to 2% by weight, particularly from 0.15 to 1.5% by weight, based on the total weight of the monomers.

The mixture can moreover comprise from 0 to 35% by weight of other vinylically unsaturated monomers, from 0 to 10% by weight of another crosslinking agent and from 0 to 20% by weight of conventional additives. According to the invention, the mixture is polymerized in bulk to give a sheet. This can take place batchwise in the cell process or continuously by charging or extruding the material into suitable tooling for shaping processes.

Examples of the other vinylically unsaturated monomers are: acrylic or methacrylic acid, and also esters thereof with lower alcohols having from 1 to 4 carbon atoms, styrene, maleic acid or its anhydride, itaconic acid or its anhydride, vinylpyrrolidone, vinyl chloride and/or vinylidene chloride. The proportion of the comonomers which cannot be cyclized to give anhydride or imide, or which are very difficult to cyclize to give anhydride or imide, is not to exceed 30% by weight, preferably 20% by weight and particularly preferably 10% by weight, based on the weight of the monomers.

The other crosslinking agents that can be used alongside the (meth)acrylic diesters of the long-chain diols can be divided into two groups: covalent crosslinking agents (D1), i.e. copolymerizable polyunsaturated compounds. Examples of monomers of this type that may be used are allyl acrylate, allyl methacrylate, allylacrylamide, allylmethacrylamide, methylenebis(meth)acrylamide, diethylenebis(allyl carbonate), ethylene glycol diacrylate or ethylene glycol dimethacrylate, diethylene glycol diacrylate or diethylene glycol dimethacrylate, triethylene glycol diacrylate or triethylene glycol dimethacrylate, tetraethylene glycol diacrylate or tetraethylene glycol dimethacrylate, tripropylene glycol diacrylate or tripropylene glycol dimethacrylate, 1,3-butanediol diacrylate or 1,3-butanediol dimethacrylate, 1,4-butanediol diacrylate or 1,4-butanediol dimethacrylate, neopentyl diol diacrylate or neopentyl diol dimethacrylate, hexane-1,6-diol diacrylate or hexane-1,6-diol dimethacrylate, trimethylolpropane diacrylate or trimethylolpropane dimethacrylate, trimethylolpropane triacrylate or trimethylolpropane trimethacrylate, pentaerythritol triacrylate or pentaerythritol trimethacrylate, pentaerythritol tetraacrylate or pentaerythritol tetramethacrylate, the pentaerythritol derivatives derived from respective tri- and tetrafunctional compounds, optionally also in the form of technical mixture, and also triallyl cyanurate or triallyl isocyanurate. Ionic crosslinking agents (D2) are another group that can be used. These are polyvalent metal cations which form ionic bridges between the acid groups of the copolymers. Examples are inter alia the acrylates or methacrylates of the alkaline earth metals or of zinc. Preference is given to Zn (meth)acrylate and to Mg (meth)acrylate. The (meth)acrylate salts can also be produced by dissolving, for example, ZnO or MgO in the monomer mixture.

The conventional additives can by way of example involve antistatic agents, antioxidants, demoulding aids, lubricants, dyes, flame retardants, flow improvers, fillers, light stabilizers and organophosphorus compounds, such as phosphites or phosphonates, pigments, release agents, weathering stabilizers and/or plasticizers.

The mixture used for the production of foamable crosslinked polymers via polymerization in bulk to give a sheet in the process according to the invention preferably involves a mixture of from 30 to 70% by weight of methacrylic acid, from 30 to 60% by weight of methacrylonitrile, from 0.01 to 15% by weight of a methacrylic diester of a diol which has a molar mass of at least 250 g/mol, where this in particular involves a polyether dimethacrylate, from 0.01 to 15% by weight of blowing agent, from 0.01 to 10% by weight of another crosslinking agent, from 0.01 to 2% by weight of polymerization initiators and from 0 to 30% by weight of other vinylically unsaturated monomers, and also from 0 to 20% by weight of conventional additives.

After the polymerization of the mixture in bulk to give a sheet, the polymer is optionally heat-conditioned and then foamed at temperatures of from 150 to 250° C.

The present invention equally provides the poly(meth)acrylimide foam which is obtained by foaming of the polymer described. The tensile strain at break of the said PMI foam according to ISO 527-2 is greater than 7.0%, in particular greater than 9.0% and particularly preferably greater than 10.0%.

The foams according to the invention can then be processed to give layer materials. The said layer materials comprise a layer of the PMI foam in a layer which is preferably central, surrounded by unfoamed polymers or by other materials, such as textiles or wood.

The foams or the layer materials produced therefrom can by way of example be included in the structure of the following: tubes, loudspeakers, antennas, X-ray tables, machine parts, motor vehicles, rail vehicles, watercraft, aircraft, spacecraft.

The examples given below are provided for illustration of the present invention, but do not restrict the invention to the features disclosed herein.

EXAMPLES

Tensile strain at break and ultimate tensile strength were determined by means of tensile tests according to ISO 527-2.

Density is measured according to ISO 845.

Heat resistance was determined according to DIN 53424.

Creep performance (creep) was measured in compliance with DIN 53425, and ASTM D621 and D2990 at 180° C., with a measurement time of two hours and a pressure of 0.7 MPa.

Inventive Example 1

355 g of tert-butanol were added as blowing agent to a mixture of 2487 g of metahcrylic acid, 2538 g of methacrylonitrile and 102 g of tert-butyl methacrylate. 2 g of tert-butyl perpivalate, 1.8 g of tert-butyl 2-ethylperhexanoate, 5.1 g of tert-butyl perbenzoate, 5.2 g of cumyl perneodecanoate, 11.2 g of magnesium oxide and 15.2 g of release agent (Moldwiz INT 20E) were also added to the mixture. 77.2 g of methacrylic diester of polyethylene glycol 400 were added as crosslinking agent.

The said mixture was polymerized for 89 h at 39° C. in a cell formed from two glass plates measuring 50×50 cm with a peripheral seal of thickness 28 mm. For the final polymerization reaction, the polymer was then subjected to a heat-conditioning programme extending from 40° C. to 115° C., for 32 h.

The subsequent foaming by the hot-air process took 2 h at 217° C. The density of the resultant foam is 105 kg/m$^3$. Tensile strain at break is 7.2% and ultimate tensile strength is 6.0 MPa. The creep test at 0.7 MPa (2 h/180° C.) is passed at 0.07% compaction. A further specimen was foamed at 205° C. for 2 h. The density of the resultant foam is 145 kg/m$^3$. Tensile strain at break is 8.3% and ultimate tensile strength is 9.0 MPa.

Inventive Example 2

593 g of tert-butanol were added as blowing agent to a mixture of 2421 g of methacrylic acid and 2471 g of methacrylonitrile. 2 g of tert-butyl perpivalate, 1.8 g of tert-butyl 2-ethylperhexanoate, 4.9 g of tert-butyl perbenzoate, 5.1 g of cumyl perneodecanoate, 10.9 g of magnesium oxide and 14.8 g of release agent (Moldwiz INT 20E) were also added to the mixture. 75.1 g of methacrylic diester of polyethylene glycol 400 were added as crosslinking agent.

The said mixture was polymerized for 118 h at 39° C. in a cell formed from two glass plates measuring 50×50 cm with a peripheral seal of thickness 28 mm. For the final polymerization reaction, the polymer was then subjected to a heat-conditioning programme extending from 40° C. to 115° C., for 32 h.

The subsequent foaming by the hot-air process took 2 h at 188° C. The density of the resultant foam was 150 kg/m$^3$. Tensile strain at break is 9.7% and ultimate tensile strength is 9.1 MPa. The creep test at 0.7 MPa (2 h/180° C.) is reliably passed at 0.36% compaction.

Inventive Example 3

340 g of tert-butanol were added as blowing agent to a mixture of 2379 g of methacrylic acid, 2428 g of methacrylonitrile and 97 g of tert-butyl methacrylate. 1.9 g of tert-butyl perpivalate, 1.8 g of tert-butyl 2-ethylperhexanoate, 4.8 g of tert-butyl perbenzoate, 5.0 g of cumyl perneodecanoate, 10.7 g of magnesium oxide and 14.5 g of release agent (Moldwiz INT 20E) were also added to the mixture. 73.8 g of methacrylic diester of polyethylene glycol 400 were added as crosslinking agent.

The said mixture was polymerized for 90 h at 39° C. in a cell formed from two glass plates measuring 50×50 cm with a peripheral seal of thickness 28 mm. For the final polymerization reaction, the polymer was then subjected to a heat-conditioning programme extending from 40° C. to 115° C., for 32 h.

The subsequent foaming by the hot-air process took 2 h at 212° C. The density of the resultant foam was 99 kg/m$^3$. Tensile strain at break is 13.0% and ultimate tensile strength is 6.0 MPa. A further specimen was foamed at 210° C. for 2 h.

The density of the resultant foam was 114 kg/m³. The creep test at 0.7 MPa (2 h/180° C.) was reliably passed, with compaction of only 0.45%.

Comparative Example 1

360 g of tert-butanol were added as blowing agent to a mixture of 2520 g of methacyrlic acid, 2572 g of methacrylonitrile and 103 g of tert-butyl methacrylate. 2.1 g of tert-butyl perpivalate, 1.9 g of tert-butyl 2-ethylperhexanoate, 5.1 g of tert-butyl perbenzoate, 5.3 g of cumyl perneodecanoate, 10.3 g of magnesium oxide and 15.4 g of release agent (Moldwiz INT 20E) were also added to the mixture. 5.1 g of allyl methacrylate were added as crosslinking agent.

The said mixture was polymerized for 88 h at 39° C. in a cell formed from two glass plates measuring 50×50 cm with a peripheral seal of thickness 28 mm. For the final polymerization reaction, the polymer was then subjected to a heat-conditioning programme extending from 40° C. to 120° C., for 32 h.

The subsequent foaming by the hot-air process took 2 h at 200° C. The density of the resultant foam is 114 kg/m³.

Tensile strain at break is 5.5% and ultimate tensile strength is 3.7 MPa. A further specimen was foamed at 190° C. for 2 h. The density of the resultant foam is 148 kg/m³. Tensile strain at break is 5.4% and ultimate tensile strength is 7.6 MPa.

The invention claimed is:

1. A process for producing a rigid foam from a foamable crosslinked polymer, the process comprising polymerizing a mixture comprising:
   (A) from 30 to 70% by weight of a (meth)acrylic acid, from 30 to 60% by weight of a (meth)acrylonitrile, and from 0 to 35% by weight of a vinylically unsaturated monomer different from the (meth)acrylic acid and the (meth)acrylonitrile;
   (B) from 0.01 to 15% by weight of a (meth)acrylic diester of a diol, the diol having a molar mass of at least 250 g/mol;
   (C) from 0.01 to 15% by weight of a blowing agent;
   (D) from 0 to 10% by weight of a crosslinking agent different from the (meth)acrylic diester of a diol of (B);
   (E) from 0.01 to 2.0% by weight of at least one polymerization initiator; and
   (F) from 0 to 20% by weight of at least one conventional additive;
   wherein the polymerization is conducted
   in bulk to form the foamable crosslinked polymer; and
   foaming said polymer to form a rigid foam.

2. The process according to claim 1, wherein: the molecular weight of the diol is at least 400 g/mol, and the foamable crosslinked polymer is in the form of a sheet.

3. The process according to claim 2, comprising foaming the crosslinker polymer sheet at temperatures of from 150 to 250° C.

4. The process of claim 3, wherein the rigid poly(meth)-acrylimide foam sheet is heat conditioned.

5. The process according to claim 1, wherein the diol is a polyetherdiol, a polyesterdiol, an oligo(meth)acrylic telechelic compound or a polyolefindiol.

6. The process according to claim 5, wherein the mixture comprises:
   (A) from 30 to 70% by weight of the (meth)acrylic acid; from 30 to 60% by weight of the (meth)acrylonitrile; from 0 to 30% by weight of the at least one different vinylically unsaturated monomer;
   (B) from 0.01 to 15% by weight of a (meth)acrylic diester of a diol which has a molar mass of from 250 to 1500 g/mol;
   (C) from 0.01 to 15% by weight of the blowing agent;
   (D) from 0.01 to 10% by weight of the different crosslinking agent;
   (E) from 0.01 to 2.0% by weight of the at least one polymerization initiator; and
   (F) from 0 to 20% by weight of the at least one conventional additive.

7. The process according to claim 1, wherein the mixture comprises:
   (A) from 30 to 70% by weight of the (meth)acrylic acid; from 30 to 60% by weight of the (meth)acrylonitrile; from 0 to 30% by weight of the at least one different vinylically unsaturated monomer;
   (B) from 0.01 to 15% by weight of a (meth)acrylic diester of a diol which has a molar mass of from 250 to 1500 g/mol;
   (C) from 0.01 to 15% by weight of the blowing agent;
   (D) from 0.01 to 10% by weight of the different crosslinking agent;
   (E) from 0.01 to 2.0% by weight of the at least one polymerization initiator; and
   (F) from 0 to 20% by weight of the at least one conventional additive.

8. A rigid poly(meth)acrylimide foam obtained by the process according to claim 1.

9. The rigid poly(meth)acrylimide foam according to claim 8, wherein a tensile strain at break of the poly(meth)acrylimide foam is greater than 7.0%.

10. A laminate, comprising a layer of the rigid poly(meth)acrylimide foam according to claim 9.

11. A laminate, comprising a layer of the rigid poly(meth)acrylimide foam according to claim 8.

12. An article, comprising the rigid poly(meth)acrylimide foam according to claim 8, said article being selected from the group consisting of a tube, a loudspeaker, an antenna, an X-ray table, a machine part, a motor vehicle, a rail vehicle, a watercraft, an aircraft, and a spacecraft.

13. The rigid poly(meth)acrylimide foam according to claim 8, having a tensile strain at break of greater than 9.0%.

14. A rigid poly(meth)acrylimide foam sheet obtained by the process according to claim 2.

15. The rigid poly(meth)acrylimide foam sheet according to claim 14, having a tensile strain at break of greater than 7.0%.

16. The rigid poly(meth)acrylimide foam sheet according to claim 14, having a tensile strain at break of greater than 9.0%.

* * * * *